Jan. 20. 1925.
W. O. SNELLING
PHOTOCHEMICAL PROCESS
Filed June 16, 1922
1,523,563
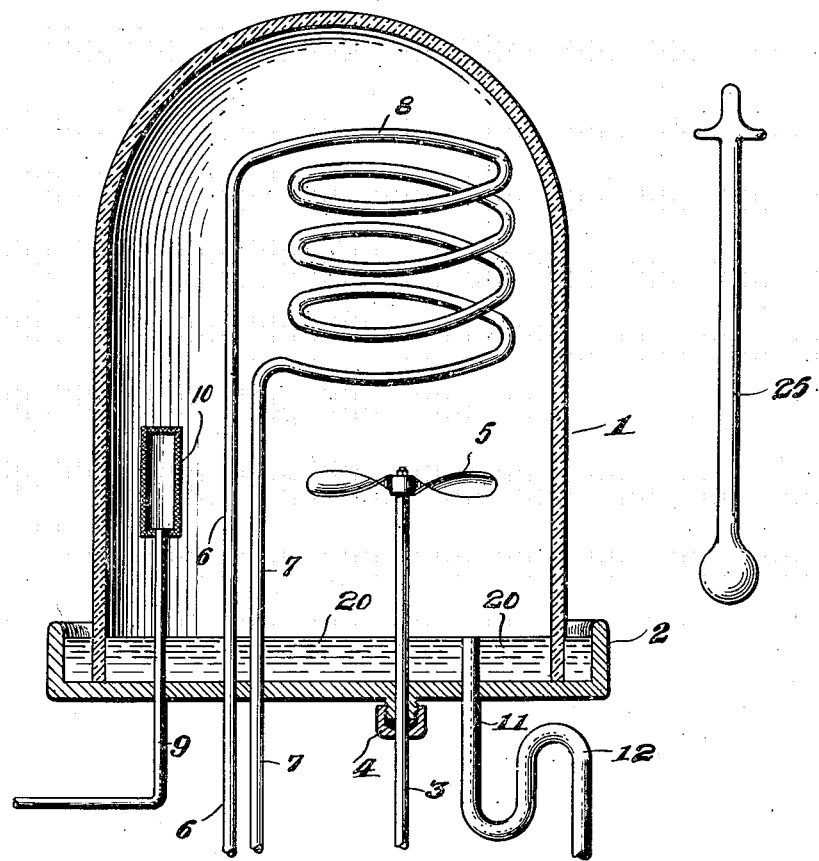
Walter O. Snelling.
Inventor.

Patented Jan. 20, 1925.

1,523,563

UNITED STATES PATENT OFFICE.

WALTER O. SNELLING, OF ALLENTOWN, PENNSYLVANIA.

PHOTOCHEMICAL PROCESS.

Application filed June 16, 1922. Serial No. 568,869.

*To all whom it may concern:*

Be it known that I, WALTER O. SNELLING, a citizen of the United States, residing at Allentown, in the county of Lehigh and State of Pennsylvania, have invented certain Improvements in Photochemical Processes, of which the following is a specification.

My invention relates to chemical reactions which involve the exposure of mixtures of gaseous reagents to actinic light for the purpose of inducing or facilitating their interaction, and it is my object to provide a simple and rapid process for performing such reactions in an economical manner and upon a commercial scale. One specific object of my invention is to prepare halogenated carbon compounds by photochemical reaction between hydrocarbons and halogens, and, in particular, to continuously produce carbon tetrachloride, chloroform, mythylene chloride, and other chlorine susbtitution products of methane, and to produce chlorine addition and chlorine substitution products of other hydrocarbons with which chlorine forms mixtures that tend to react with explosive violence under the influence of actinic light.

The single figure in the accompanying drawing is a central vertical sectional view of a reaction cell capable of carrying out the process of my present invention.

It has long been recognized that mixtures of a hydrocarbon such as methane with a halogen such as chlorine are extremely explosive, and it is also well known that exposure to actinic rays will induce or cause an explosive reaction in such gaseous mixtures. Thermochemical investigations have shown that the amount of heat produced in the reaction between a halogen such as chlorine and a hydrocarbon such as methane is more than sufficient to raise the reacting materials to the temperature of ignition, and accordingly it would appear impossible to expose an explosive mixture of a gaseous hydrocarbon and a gaseous halogen to conditions which will cause their reaction and the evolution of more than sufficient heat to raise the reacting materials to their ignition temperature, without an explosion resulting.

In my pending application S. N. 152,589 I have shown that under certain definite conditions it is possible to expose a mixture of a gaseous halogen and a gaseous hydrocarbon, present in explosive proportions, to actinic rays without an explosion resulting, and in the application mentioned I have described and claimed a method of producing this result. I have since found that the method described in application S. N. 152,-589 is only a specific application of a much broader principle, and in the present application I will describe means by which a wide variety of explosive gaseous mixtures may be caused to combine by photochemical reaction without explosion, and under conditions particularly adapted to the cheap industrial preparation of chlorinated compounds.

I have discovered that although the amount of heat which is evolved when one or more molecules of a gaseous halogen react with a molecule of a hydrocarbon is far more than sufficient to raise the reacting molecules to their temperature of ignition, yet it is possible to bring about such reaction between a gaseous hydrocarbon and a gaseous halogen if the gaseous mixture of the two bodies is vigorously agitated or stirred during the period of reaction. Since vigorously stirring any gaseous mixture increases rather than decreases the temperature of such gaseous mixture, (the increase in temperature being proportional to the amount of energy employed in stirring or agitating the mixture), the result described is most unusual and unexpected.

Careful experiments have proven that, for reasons at present unknown, all of the molecules in a gaseous mixture of a halogen and a hydrocarbon are not equally reactive at any single moment of time. Accordingly, if a beam of actinic light is passed into a vessel containing a mixture of a halogen and a hydrocarbon in explosive proportions, there will not occur a simultaneous reaction between all of the halogen molecules and all of the hydrocarbon molecules, but instead certain halogen molecules will tend to react, and certain other halogen molecules will at the same moment tend to remain passive. The halogen molecules which react will produce an evolution of heat, and this evolution of heat will warm adjacent molecules of the halogen, and the increased temperature so produced will increase the reactivity of such adjacent molecules, and accordingly although only a few halogen molecules will react with the adjacent hydrocarbon molecules during a very brief period of illumination, long illumination will cause an increasing number of molecules to react, and there will occur a rapid acceleration in the rate of union between the halogen molecules and the hydrocarbon molecules, until after a few moments the rate of combination will become so rapid that it will assume explosive proportions, and the gaseous mixture will then explode.

It is probable that although at any one instant only a relatively small proportion of the halogen molecules in a gaseous mixture are reactive under the influence of actinic rays, this is due to some condition of such molecules, rather than the reactive molecules being different chemically from the less reactive molecules. It is well known, for example, that under the influence of the long continued action of light of very low actinic or photochemical intensity, all of the chlorine in a mixture of chlorine with methane will react, although in any given short period of time only a very few molecules will react. This would seem to prove that there is no essential difference between highly reactive and very inert molecules, since exposure for a sufficiently long time to subdued light will cause all of the molecules to become reactive. It is probable that a halogen molecule which is reactive at one time may become quite inert at a later period of time, and that an inert molecule may become highly reactive after a time, each molecule apparently passing through some sort of a cycle in which it has its reactive periods and its inert periods.

By vigorously stirring a mixture of a gaseous halogen and a gaseous hydrocarbon present in explosive proportions, while exposing such mixture to actinic rays of such intensity as would bring about the explosion of the mixture in the course of a very few seconds if the stirring were to stop, I am able to bring about the rapid reaction of halogens and hydrocarbons, under conditions which are particularly adapted to the large scale preparation of halogenated bodies. As each reactive molecule of halogen unites with a hydrocarbon molecule, there is undoubtedly produced the same amount of heat as is produced when the same reaction occurs under normal conditions, but the effect of the rapid agitation which I employ sweeps the reacting molecules away from adjacent molecules which otherwise would share the heat of reaction with the reacting molecules, and which would thereby have their temperature raised to a point sufficient to cause their rapid reaction, and this process would be repeated with other adjacent molecules until the accelerating rapidity of reaction would bring about the explosion of the entire mixture.

It will be evident that since the same amount of heat is evolved from the union of a given weight of a halogen with a given weight of a hydrocarbon, regardless of how the reaction between the two materials is brought about, it is necessary that I should remove heat from my system if I am to continuously carry out my process as described, and accordingly I find it desirable to employ cooling coils or other equivalent means for removing heat from my reacting gaseous mixture, but I wish particularly to point out the fact that such removal of heat is an incidental factor of my process, and that it is the stirring of my gaseous mixture, and the preventing of reacting molecules from remaining in contact with adjacent molecules during the period of illumination, which is the effective factor in making my process possible. I have, for example, determined the time which a given mixture of methane and chlorine could be exposed to a given intensity of illumination before explosion, in my particular experiments this period of time being about 15 seconds. Using a mixture of the same composition in a vessel of the same nature and exposing the mixture to the same intensity of illumination, but employing a small fan in the vessel to produce a vigorously stirring of the gaseous mixture, I have found that no explosion would result, and examination of the contents of the vessel after about 10 minutes showed that complete reaction had occurred between the halogen and the hydrocarbon. I have repeated this experiment many times, without using any cooling means whatever, and have always obtained the same result, thus showing clearly that it is the effect of the stirring in preventing reacting molecules from remaining in contact with molecules which have not yet reacted, and thereby raising the temperature of these molecules and accelerating their rate of reaction, which makes it possible for me to expose explosive mixtures of photochemically reactive gases to actinic rays of high intensity without producing the explosion of such mixtures.

In carrying out my process, I prefer to operate continuously, and under these conditions the removal of the heat produced by reaction is necessary in order that the same conditions may exist continuously in the reaction vessel. In the drawing I have shown one form of apparatus which is adapted to the practice of my present invention, 1 being a dome or vessel of glass or other material transparent to actinic rays, 2 being a dish or tray upon which dome 1 rests, 3 being a shaft projecting through tray 2, a liquid-tight seal being provided by means of stuffing box 4. 5 is a stirrer attached to shaft 3, of such form as to cause the vigorous agitation of the gaseous mixture in vessel 1 when shaft 3 is rotated. 6 and 7 are two pipes passing through the bottom of tray 2, these pipes being attached to coil 8. 9 is a pipe which also passes through the bottom of tray 2 and which is attached to a porous vessel 10. 11 is still another pipe passing through the bottom of tray 2, this pipe being adapted to carry off liquid products of reaction, and being provided with a trap 12, to prevent gaseous products of reaction from also escaping. 20 is a liquid seal present in tray 2, and 25 is a source of actinic rays, such as a mercury vapor light or other equivalent illuminating device.

In operatig the apparatus as described, a mixture of a gaseous halogen and a gaseous hydrocarbon is introduced through pipe 9, and passes through the porous vessel 10 into the main reaction vessel 1. The interior of reaction vessel 1 is illuminated by actinic rays from lamp 25, and the gaseous contents of vessel 1 are kept in vigorous agitation by the rapid movement of the stirrer 5, driven by shaft 3. Cold water or other cooling medium is introduced through pipe 6, and passes through coil 8 and out through pipe 7. The gaseous mixture introduced through pipe 9 and porous vessel 10 undergoes vigorous reaction in vessel 1 through the influence of actinic rays from light 25, and liquid products of reaction accumulate in tray 2, up to the upper limit permitted by overflow pipe 11, a continuous stream of the reaction products passing out through pipe 11 and trap 12.

Although preferably my stirrer 5 is of fan or propellor shape, and is so rotated as to direct the circulation of the gaseous reaction products in vessel 1 in the direction from propellor 5 to coil 8 and then past porous vessel 10 and back to the fan 5, this is not necessary, and satisfactory results can be obtained when the stirrer 5 is rotated in the opposite direction, or even when the stirrer arms are of such a nature as to produce no constant directive motion to the gases passing near it, the essential work of the fan being to so vigorously agitate the gaseous products in vessel 1 that the reacting molecules will be moved rapidly in every direction so as to be separated and torn away from adjacent unreacting molecules, so as to avoid the effect of the transmission of the heat of reaction to such adjacent molecules over a sufficiently long period of time to enable such adjacent molecules to reach the reactive phase, and to react at accelerated speed.

Apparatus of the type described in this application is capable of producing quantities of halogenated products of a wholly different magnitude from any halogenation apparatus previously known, and by the use of a rapidly driven stirrer and an efficient cooling coil, a single relatively small unit can produce more than 100 kilos of liquid chlorinated products per day. Since any stoppage of the stirring fan or propeller will cause the almost instant explosion of the reaction vessel, I find it desirable to employ a governor upon my stirrer shaft 3, so arranged that any slowing down or stoppage of this stirrer will break the electrical circuit to lamp 25, but this arrangement does not form a part of my present invention, although it may conveniently be operated in connection therewith.

It wil be evident that many modifications may be employed without departing from the essential features of my invention as herein disclosed. Although the apparatus described and illustrated in this application forms a convenient device for the practice of my invention, it will be evident that the fundamental principle of vigorously stirring a gaseous reacting mixture of a halogen and a hydrocarbon while exposing such mixture to the influence of actinic rays, may be carried out in many other forms of apparatus, and accordingly I do not wish to be limited in any way to the particular elements of the device as shown, and no limits are to be placed upon my invention except as indicated in the appended claims.

I claim:

1. The process which comprises mechanically stirring a body of irradiated photochemically reactive gases.

2. The process which comprises introducing photochemically reactive gases into a vessel, exposing such gaseous mixture to actinic rays, and mechanically agitating such mixture during the period of illumination.

3. The process which comprises producing movement by mechanical means within a body of gases undergoing photochemical reaction.

4. The process which comprises exposing photochemically reactive gases to actinic rays while vigorously stirring the reaction mixture, and simultaneously withdrawing the heat produced by the photochemical reaction.

5. The process which comprises introducing photochemically reactive gases into a reaction vessel, exposing such gases to actinic rays, stirring such gases during the period of photochemical reaction, and withdrawing the heat produced by such reaction.

6. The process which comprises introducing photochemically reactive gases into a reaction vessel, agitating the contents of such reaction vessel by a mechanical stirrer, illuminating the reactive gases to bring about photochemical reaction, and withdrawing the products of such reaction from the reaction vessel.

In testimony whereof, I have hereunto subscribed my name this 7th day of June 1922.

WALTER O. SNELLING.